(12) United States Patent
Amann et al.

(10) Patent No.: US 8,486,215 B2
(45) Date of Patent: Jul. 16, 2013

(54) TWO-PIECE WASHING TANK FOR A DISHWASHER AND A METHOD FOR MANUFACTURING A TWO-PIECE WASHING TANK FOR DISHWASHERS

(75) Inventors: Klaus Amann, Giengen (DE); Helmut Jerg, Giengen (DE); Cengiz Kücük, Syrgenstein (DE); Anton Oppel, Syrgenstein (DE); Manfred Seeβle, Gerstetten (DE); Ernst Stickel, Giengen (DE); Wilhelm Thibaut, Sontheim (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 13/620,723

(22) Filed: Sep. 15, 2012

(65) Prior Publication Data

US 2013/0008598 A1     Jan. 10, 2013

Related U.S. Application Data

(63) Continuation of application No. 10/845,961, filed on May 14, 2004, which is a continuation of application No. PCT/EP02/12220, filed on Oct. 31, 2002.

(51) Int. Cl.
| | |
|---|---|
| *A61F 13/15* | (2006.01) |
| *B32B 37/00* | (2006.01) |
| *B29C 65/00* | (2006.01) |
| *F02F 1/06* | (2006.01) |
| *A47B 77/06* | (2006.01) |
| *A47K 1/04* | (2006.01) |
| *A47L 19/02* | (2006.01) |
| *E03C 1/18* | (2006.01) |

(52) U.S. Cl.
USPC ......... 156/293; 156/227; 156/303.1; 312/228

(58) Field of Classification Search
USPC ........ 156/60, 69, 196, 211, 227, 242, 244.11, 156/245, 246, 250, 252, 293, 303.1, 304.1, 156/304.2, 304.5, 304.6; 312/228, 229, 296, 312/311, 351.1, 351.2, 351.4, 351.7, 400, 312/401, 406, 406.2; 134/105, 184, 200, 134/201
See application file for complete search history.

(56) References Cited

U.S. PATENT DOCUMENTS

| 1,722,744 A | 7/1929 | Hasse |
| 3,826,553 A | 7/1974 | Cushing et al. |

(Continued)

FOREIGN PATENT DOCUMENTS

| DE | 2416898 A1 | 10/1975 |
| DE | 2420302 A1 | 11/1975 |

(Continued)

OTHER PUBLICATIONS

International Search Report PCT/EP02/12220.

*Primary Examiner* — Philip Tucker
*Assistant Examiner* — Brian R Slawski
(74) *Attorney, Agent, or Firm* — James E. Howard; Andre Pallapies

(57) ABSTRACT

A two-piece washing tank for a dishwasher and a method for manufacturing the two-piece washing tank for a dishwasher. The dishwasher includes a washing container and an assembly base made from plastic. The washing container has a base formed from a substantial portion of the top side of the plastic assembly base and side and rear walls formed substantially of stainless steel.

20 Claims, 3 Drawing Sheets

U.S. PATENT DOCUMENTS

| | | |
|---|---|---|
| 4,098,545 A | 7/1978 | Gaiser et al. |
| 4,572,596 A | 2/1986 | Weir et al. |
| 4,618,193 A | 10/1986 | Cuthbert et al. |
| 4,801,181 A | 1/1989 | Cordill et al. |
| 5,125,191 A | 6/1992 | Rhoades |
| 5,299,586 A | 4/1994 | Jordan et al. |
| 5,330,262 A | 7/1994 | Peters |
| 5,368,379 A * | 11/1994 | Wrangberth .................. 312/228 |
| 5,605,061 A | 2/1997 | Durazzani |
| 6,341,830 B1 | 1/2002 | Chun |
| 2004/0056575 A1 | 3/2004 | Dietz et al. |
| 2005/0016569 A1 | 1/2005 | Rosenbauer et al. |
| 2005/0285487 A1 | 12/2005 | Noh |

FOREIGN PATENT DOCUMENTS

| | | |
|---|---|---|
| DE | 3440240 C1 * | 3/1986 |
| DE | 4124627 A1 | 1/1993 |
| EP | 0556787 A1 | 8/1993 |
| WO | 2007020241 A2 | 2/2007 |

* cited by examiner

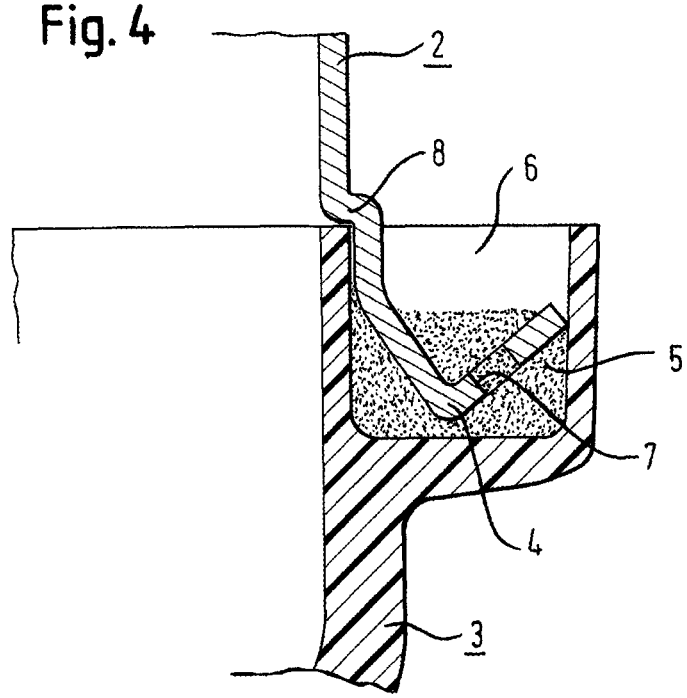
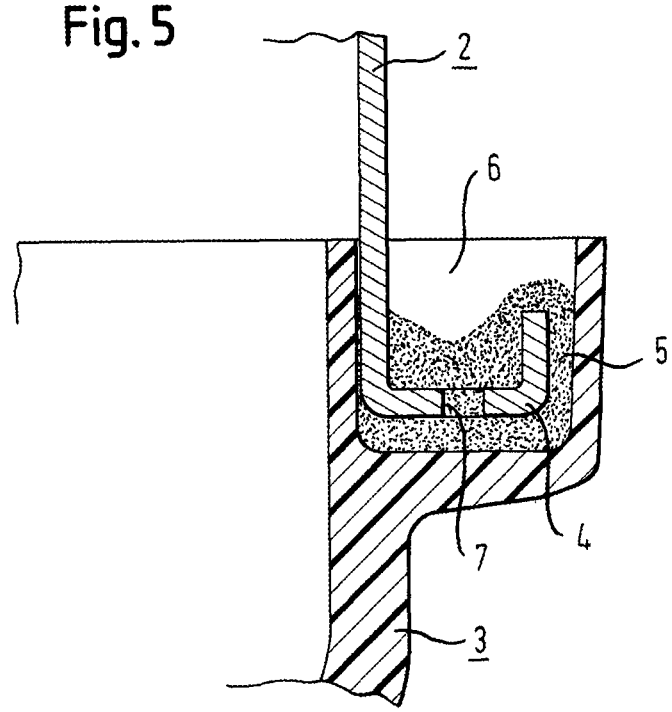

TWO-PIECE WASHING TANK FOR A DISHWASHER AND A METHOD FOR MANUFACTURING A TWO-PIECE WASHING TANK FOR DISHWASHERS

CROSS-REFERENCE TO RELATED APPLICATIONS

This application is a Continuation Application, under 35 U.S.C. §120, of U.S. application Ser. No. 10/845,961, filed May 14, 2004, now allowed, which is a Continuation Application under 35 U.S.C. §§120 and 365 (c) of PCT/EP02/12220, filed Oct. 31, 2002, which designated the United States; this application also claims the priority, under 35 U.S.C. §119(b), to German Application No. DE 101 56 423.6, filed Nov. 16, 2001; the entire contents of all the above identified patent applications are hereby incorporated by reference.

FIELD OF THE INVENTION

The present invention relates to a dishwasher comprising an assembly base made of plastic and a washing container, a method for manufacturing a two-piece tank for a dishwasher comprising an assembly base made of plastic and a washing container, and particularly, to a method for connecting a plastic assembly base of a dishwasher to a washing container.

BACKGROUND OF THE INVENTION

Washing containers made of stainless steel have been known for some time now, whereby the whole body structure of the washing container is extruded from a cylindrical sheet and the rear wall of the washing container is attached to the stainless steel body by means of joining methods, such as for example welding. Once the steel washing container is made it is fixed to a so-called assembly base and the necessary equipment such as pump, sieve etc. Are introduced to the steel washing container or the underlying assembly base, where they are fixed in place. Aside from the material costs for stainless steel the method for manufacturing the steel washing container is time- and cost-intensive and is possible only by means of a plurality of different procedural steps, whereby each of the working steps takes place in different special tools.

BRIEF SUMMARY OF THE INVENTION

The object of the present invention is therefore to provide a dishwasher, or a washing container, which can on the one hand display the advantages of an inert, steel washing container, and on the other hand be manufactured by a rapid method.

This task is solved by the inventive dishwasher having the characteristics according to the exemplary embodiments described herein, as well as by the inventive method having the characteristics according to the exemplary embodiments described herein.

With the inventive dishwasher, comprising an assembly base made of plastic and a washing container, an essential constituent of the top side of the assembly base is made of plastic and forms the base of the washing container.

According to a preferred embodiment of the invention the side walls of the washing container are designed substantially of stainless steel.

Through the inventive combination of plastic and stainless steel the advantages of stainless steel are used for the side walls, the rear wall and the inner lining of the door, and the advantages of plastic are used to form the base of the washing container, in which several components are to be arranged. In this connection it is particularly advantageous that all connecting arrangements are made on the assembly base already during one manufacturing step and thus there is considerable time economy as compared to conventional methods.

According to a preferred embodiment of the invention the connection areas between the assembly base made of plastic and the washing container made of stainless steel are provided on the side walls and the rear wall of the washing container.

According to a preferred feature of the invention the connection areas are formed by a grooved recess on the assembly base made of plastic and a corresponding insert section on the side walls and the rear wall of the washing container made of stainless steel.

In order to create a watertight and permanent connection between the washing container made of stainless steel and the assembly base made of plastic, in particular with consideration for the lifetime of a dishwasher, the grooved recess is filled with a plastic with adhesive properties, in which the insert section on the side walls and the rear wall of the washing container made of stainless steel immerses and remains.

The plastic with adhesive properties is designed effectively such that due to its viscosity placing it in the grooved recess is technically unproblematic and the processing time of the plastic with adhesive properties can be such that the corresponding insert sections can be attached to the side walls and the rear wall of the washing container made of stainless steel during assembly of the washing container in the grooved recess, which is filled with the plastic with adhesive properties.

By way of advantage the plastic with adhesive properties placed in the grooved recess of the assembly base sets after a certain time, with or without the effect of temperature, and thus forms an undetachable connection, both with the assembly base made of plastic and with the washing container made of stainless steel. The plastic with adhesive properties placed peripherally in the grooved recess of the assembly base and the likewise continuous adhesive connection of the washing container made of stainless steel with the plastic with adhesive properties enables the connection area between the assembly base made of plastic and the washing container made of stainless steel to be watertight.

Apart from these water tightness requirements it is also an advantage of the inventive dishwasher and of the inventive method that there is an aesthetically high-grade connection between the assembly base made of plastic and the washing container made of stainless steel, because for the user, who is able to glimpse only the inner reaches of the washing container, a flush connection between the assembly base made of plastic and the washing container made of stainless steel is perceived, and furthermore this substantially seam-free connection between the assembly base made of plastic and the washing container made of stainless steel forms a hygienic connection, into which no food remains can penetrate.

To improve the connection between the washing container made of stainless steel and the plastic with adhesive properties, which is placed in the grooved recess in the assembly base made of plastic, the insert section on the side walls and the rear wall of the washing container made of stainless steel is provided advantageously with open spaces, through which the viscous plastic with adhesive properties can penetrate into the grooved recess when the insert section is inserted, and thus forms a positive connection between plastic with adhesive properties and the steel insert section apart from the adhesive connection.

The open spaces in the insert section of the washing container are effectively distributed over the entire length and can for example be designed as a longitudinal hole or a cross-vent.

The insert section is designed advantageously V-shaped, whereby a leg of the V merges into the side wall of the washing container and the other leg of the V is designed to be lowered in the grooved recess. Due to this V-shaped configuration it eventuates that the largest possible surface of the insert section comes into contact with the plastic with adhesive properties, and thus on the one hand the tightness and the mechanical grip between the washing container and the assembly base are improved.

It is also possible to form the insert section not V-shaped, but to provide at its end an L- or U-shaped contour, as long as the mechanical properties and sealing requirements can be assured.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein:

FIG. 4 is an enlarged sectional view through the insert section, whereby the inner surface of the washing container is designed substantially free of a step, and FIG. 5 is an enlarged sectional view through the connection area, whereby the insert section is designed U-shaped with open spaces.

DETAILED DESCRIPTION OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
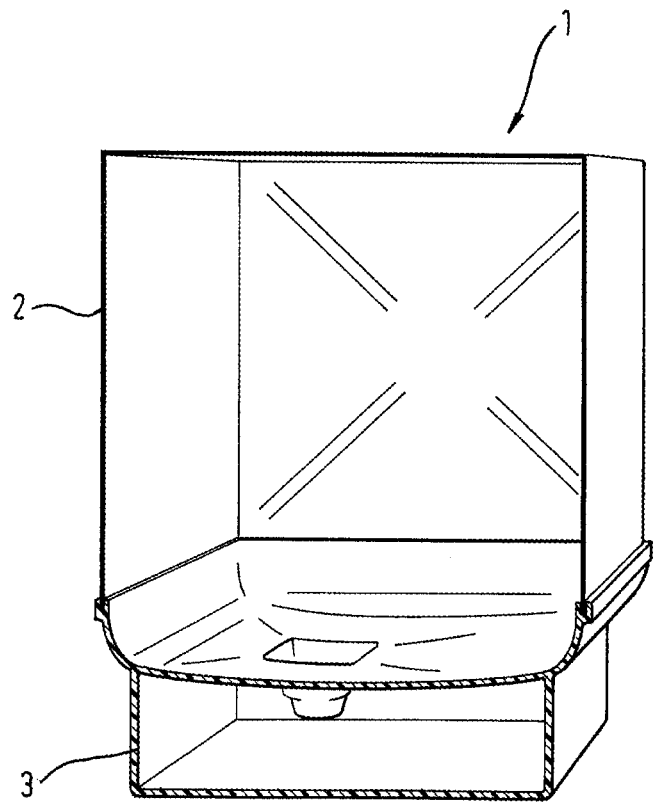
FIG. 1 is a perspective view of a section through a basic body of the inventive dishwasher or inventive washing container with mounted assembly base.

In the arrangement according to FIG. 1 a basic body of a dishwasher 1 according to the present invention is illustrated, comprising an assembly base 3 and a washing container 2.

Due to the compact manufacturing process of the assembly base 3 it is possible in a single work procedure to manufacture the assembly base 3, advantageously comprising plastic, monobloc, for example in an injection moulding process. With this efficient manufacturing method it can be ensured that all connection areas, such as for example pump, lye pump, filter etc. are fitted with connection possibilities, so that the washing container 2 would have to display only a few necessary more connection possibilities. Aside from the option illustrated in FIG. 1 of creating the connection area between assembly base 3 and washing container 2 via a leg of certain height, it is likewise possible to arrange the connection area directly on the top side of the assembly base 3, so that only the top side of the assembly base 3 forms the base of the washing container.

Figure 2:
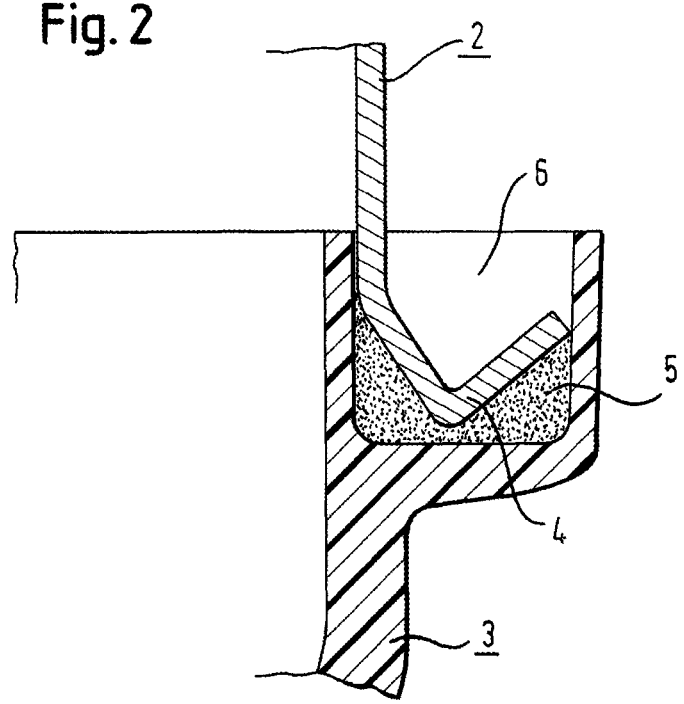
FIG. 2 is an enlarged sectional view through the connection area between washing container and assembly base, whereby the insert section is V-shaped.

The enlarged detail view of the connection areas according to FIG. 2 illustrates the grooved recess 6 on the assembly base 3, as well as the plastic 5 with adhesive properties provided for sealing between washing container 2 and assembly base 3. In preparation for assembly the plastic 5 with adhesive properties is placed in the grooved recess 6 of the assembly base 3, whereby the latter is e.g. in the form of a strand or is extruded as a strand, to ensure that the plastic 5 with adhesive properties is laid out continuously in the grooved recess 6. The plastic 5 with adhesive properties is in viscous form, or is brought to viscous form e.g. by heating and the insert section 4 of the washing container 2 is pressed into the viscous plastic 5 with adhesive properties, so that the latter spreads out in the grooved recess 6 of the assembly base 3, thus forming a watertight connection between the assembly base 3 and the insert section 4.

Figure 3:
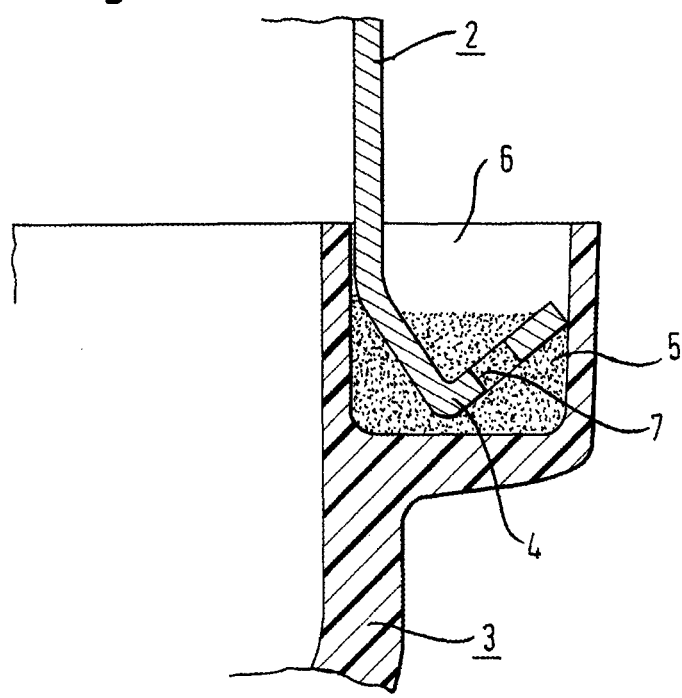
FIG. 3 is an enlarged sectional view through the insert section according to FIG. 2, but whereby the insert section has open spaces.

According to an advantageous embodiment of the invention the insert section 6 is provided with open spaces 7, as shown in FIG. 3, so that the viscous plastic 5 with adhesive properties is pressed through these open spaces 7 during pressing of the insert section 4, and thus forms a positive connection with the insert section 4 of the washing container 2 after the plastic 5 with adhesive properties hardens.

In assembling the washing container 2 care should always be taken that the processing of the plastic 5 with adhesive properties within the grooved recess 6 progresses such that no air chambers develop, which might negatively influence the water tightness.

As shown in the arrangement according to FIG. 4, in a further advantageous embodiment of the present invention a step 8 is made in the side walls and rear wall of the washing container 2, which is arranged and formed such that after assembly a substantially flush surface can be perceived in the interior of the washing container. By way of advantage and aside from aesthetic considerations the step 8 also serves as justification during the assembly process, since the washing container 2 can be set on the step 8, while the insert section 4 is inserted into the viscous plastic 5 with adhesive properties, thus forming a predetermined holding position of the insert section 4.

In a further advantageous embodiment according to FIG. 5 an insert section 4 is designed U-shaped and is of such a size that while the insert section 4 is pressed into the grooved recess 6 of the assembly base 3 the viscous plastic 5 with adhesive properties can flow past the insert section 4 and thus form a virtually complete covering of the insert section 4, so that the mechanical connection between washing container 2 and assembly base 3 is increased as compared to other embodiments, and the water tightness can be fixed in addition by simple optical examination.

In a preferred embodiment of the present invention the adhesive Sikaflex-221® by Sika Industry is used, but other individual constituents of polyurethane adhesives can also be used.

Sikaflex-221® is advantageously processed such that after a period of 45 to 60 minutes a skin forms and the washing container made of stainless steel has assumed its exact position, in which it remains until the adhesive cures. The cure rate in the Sikaflex-221® adhesive is 3 mm/24 h on average.

Using adhesive ensures that the operating temperatures of the dishwasher do not negatively influence sealing properties and mechanical properties of the connection. The maximum operating temperature in the plastic with adhesive properties at the highest operating temperatures of the dishwasher is ca. 80 to 90° C.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A method for connecting a plastic assembly base to a washing container at least partially formed from stainless steel, the method comprising:
    forming the washing container with side walls and a rear wall;
    forming insert sections on the side walls and the rear wall of the washing container, wherein the insert sections are bevelled into substantially V-shaped or substantially U-shaped sections;
    forming a grooved plastic connection recess in the plastic assembly base;
    filling the grooved plastic connection recess with a viscous plastic with adhesive properties;
    inserting the washing container into the grooved plastic connection recess displacing the viscous plastic; and
    hardening the viscous plastic to form a substantially non-detachable connection between the washing container and the plastic assembly base,
    wherein the inserting includes inserting the substantially V-shaped or substantially U-shaped sections into the viscous plastic in the grooved plastic connection recess and displacing the viscous plastic to form at least a portion of the substantially non-detachable connection between the washing container and the plastic assembly base.

2. The method of claim 1, further comprising forming the washing container with the side walls and the rear wall formed substantially of stainless steel and forming connection areas between the plastic assembly base and the side walls and the rear wall of the washing container.

3. The method of claim 2, further comprising forming stainless steel insert sections on the stainless steel side walls and the stainless steel rear wall of the washing container.

4. The method of claim 3, wherein the inserting includes inserting the stainless steel insert sections into the grooved plastic connection recess displacing the viscous plastic to form the substantially non-detachable connection between the washing container and the plastic assembly base.

5. The method of claim 4, further comprising forming the stainless steel insert sections on the stainless steel side walls and the stainless steel rear wall to include open spaces formed therein and forcing the adhesive property plastic to penetrate into the open spaces to form at least a portion of the substantially non-detachable connection between the washing container and the plastic assembly base.

6. The method of claim 1, further comprising forming a connection area on an inside of the washing container to include a single step forming a transition region between the stainless steel walls and the plastic assembly base.

7. A method for connecting a plastic assembly base to a washing container at least partially formed from stainless steel, the method comprising:
    forming a grooved plastic connection recess in the plastic assembly base;
    filling the grooved plastic connection recess with a viscous plastic with adhesive properties;
    inserting the washing container into the grooved plastic connection recess displacing the viscous plastic; and
    hardening the viscous plastic to form a substantially non-detachable connection between the washing container and the plastic assembly base,
    the method further comprising forming a connection area on an inside of the washing container to form a substantially flush transition region surface between the stainless steel walls and the plastic assembly base.

8. The method of claim 1, further comprising forming the insert sections on the side walls and the rear wall to include open spaces formed therein and forcing the adhesive property plastic to penetrate into the open spaces to form at least a portion of the substantially non-detachable connection between the washing container and the plastic assembly base.

9. A method for connecting a plastic assembly base to a washing container of a dishwasher, the washing container including side walls formed substantially of stainless steel and a rear wall formed substantially of stainless steel, the washing container including a base formed from a substantial portion of a top side of the plastic assembly base and including connection areas between the plastic assembly base and the side walls and the rear wall of the washing container, the connection areas including a groove formed in the plastic assembly base and stainless steel insert sections for disposition within the groove, the insert sections being formed on the stainless steel side walls and extending continuously therealong, and the stainless steel rear wall of the washing container and extending continuously therealong, the groove having an adhesive property plastic disposed therein and the stainless steel insert sections formed on the stainless steel side walls and the stainless steel rear wall being disposed the adhesive property plastic in the groove, and the stainless steel insert sections being bevelled into a substantially V-shaped section, which V-shaped sections are disposed in the adhesive property plastic in the groove,
    the method comprising:
    forming the groove in the plastic assembly base;
    filling the groove with the adhesive property plastic;
    inserting the stainless steel insert sections, which are formed on the stainless steel side walls and the stainless steel rear wall, and the stainless steel insert sections bevelled into the substantially V-shaped sections into the adhesive property plastic in the groove and displacing the adhesive property plastic; and
    hardening the adhesive property plastic to form a substantially non-detachable watertight connection between the washing container and the plastic assembly base.

10. The method of claim 9, further comprising forming open spaces in the stainless steel insert sections on the stainless steel side walls and the stainless steel rear wall such that the adhesive property plastic penetrates the open spaces when the stainless steel insert sections are inserted into the groove.

11. The method of claim 9, further comprising forming breakout apertures in the stainless steel insert sections on the stainless steel side walls and the stainless steel rear wall such that the adhesive property plastic penetrates the open spaces when the stainless steel insert sections are inserted into the groove.

12. The method of claim 9, wherein the connection areas on an inside of the washing container include a single step forming a transition region between the stainless steel walls and the plastic assembly base.

13. The method of claim 9, wherein the connection areas on an inside of the washing container form a substantially flush transition region surface between the stainless steel walls and the plastic assembly base.

14. The method of claim 9, wherein the groove includes an inner channel wall and an outer channel wall extending to substantially a same height as a height of the inner channel wall.

15. The method of claim 9, wherein the stainless steel side walls and the stainless steel rear wall of the washing container are seated in the groove such that the adhesive property plastic extends vertically along inner and outer portions of each of the stainless steel side walls and the stainless steel rear wall of the washing container within the groove.

16. The method of claim 9, further comprising forming the adhesive property plastic substantially without any gap along an entirety of the groove to form a barrier that reduces a migration therepast of fluid from an interior of the dishwasher to an exterior of the dishwasher.

17. The method of claim 1, further comprising:
   forming a substantially flush transition region surface on an inside of the washing container between an interior sidewall of the stainless steel walls and an interior sidewall of the plastic assembly base,
   the forming the substantially flush transition region surface including:
      forming a step on each of the side walls and the rear wall of the washing container; and
      setting the step on a surface of the plastic assembly base to form a predetermined holding position of the washing container on the plastic assembly base while the substantially V-shaped or substantially U-shaped sections of the washing container are inserted into the grooved plastic connection recess displacing the viscous plastic.

18. The method of claim 7, wherein the forming the connection area includes:
   forming a step on each of the side walls and the rear wall of the washing container; and
   setting the step on a surface of the plastic assembly base to form a predetermined holding position of the washing container on the plastic assembly base while the washing container is inserted into the grooved plastic connection recess displacing the viscous plastic such that the substantially flush transition region surface is formed on an inside of the washing container between an interior sidewall of the stainless steel walls and an interior sidewall of the plastic assembly base.

19. The method of claim 7, further comprising forming the insert sections on the side walls and the rear wall to include open spaces formed therein and forcing the adhesive property plastic to penetrate into the open spaces to form at least a portion of the substantially non-detachable connection between the washing container and the plastic assembly base.

20. The method of claim 9, further comprising:
   forming a substantially flush transition region surface on an inside of the washing container between an interior sidewall of the stainless steel walls and an interior sidewall of the plastic assembly base,
   the forming the substantially flush transition region surface including:
      forming a step on each of the side walls and the rear wall of the washing container; and
      setting the step on a surface of the plastic assembly base to form a predetermined holding position of the washing container on the plastic assembly base while the substantially V-shaped sections of the washing container are inserted into the grooved plastic connection recess displacing the viscous plastic.

* * * * *

UNITED STATES PATENT AND TRADEMARK OFFICE
CERTIFICATE OF CORRECTION

PATENT NO. : 8,486,215 B2  
APPLICATION NO. : 13/620723  
DATED : July 16, 2013  
INVENTOR(S) : Klaus Amann et al.

Page 1 of 1

It is certified that error appears in the above-identified patent and that said Letters Patent is hereby corrected as shown below:

On the Title Page, Insert

--(30) Foreign Application Priority Data  
    November 16, 2001                           (DE)......101 56 423.6--

Signed and Sealed this  
Third Day of September, 2013

Teresa Stanek Rea  
*Acting Director of the United States Patent and Trademark Office*